United States Patent [19]

Nishio et al.

[11] Patent Number: 5,812,509
[45] Date of Patent: Sep. 22, 1998

[54] RECORDING MEDIUM, RECORDING APPARATUS AND REPRODUCING APPARATUS

[75] Inventors: Ayataka Nishio; Yasuhiro Ogura, both of Tokyo, Japan

[73] Assignee: Sony Corporation, Tokyo, Japan

[21] Appl. No.: 935,320

[22] Filed: Sep. 22, 1997

Related U.S. Application Data

[62] Division of Ser. No. 693,440, Aug. 7, 1996, Pat. No. 5,748,594.

[30] Foreign Application Priority Data

Aug. 9, 1995 [JP] Japan ................................ 7-222748
Aug. 9, 1995 [JP] Japan ................................ 7-222750

[51] Int. Cl.$^6$ ......................................... G11B 5/76
[52] U.S. Cl. ............................... 369/59; 369/58
[58] Field of Search ............................ 369/47, 48, 49, 369/50, 53, 54, 58, 59, 124

[56] References Cited

U.S. PATENT DOCUMENTS 5,315,571  5/1994  Maeda et al. .

FOREIGN PATENT DOCUMENTS

| 0386914 | 9/1990 | European Pat. Off. . |
| 0440224 | 8/1991 | European Pat. Off. . |
| 0499295 | 8/1992 | European Pat. Off. . |
| 0530468 | 3/1993 | European Pat. Off. . |
| 0777227 | 6/1997 | European Pat. Off. . |
| 9630906 | 10/1996 | WIPO . |

*Primary Examiner*—Paul W. Huber
*Attorney, Agent, or Firm*—Jay H. Maioli

[57] ABSTRACT

A second generation CD provides improved sound quality over that provided by a first generation CD while remaining compatible with it has a higher sampling rate and has a data format of 1-bit $\Delta\Sigma$ modulation. The higher sampling frequency is an integer multiple of the standard sampling frequency of 44.1 kHz used in the first generation CD to thereby simplify the clock signal generation circuitry. The recording system uses decimation filters to lower the sampling frequency of the 1-bit $\Delta\Sigma$ modulation signal so that the same signal can be used to manufacture both a first generation CD and a second generation CD. The playback apparatus is compatible and the kind of disk is determined based on the table of contents information, so that the appropriate clock signals can be provided to the decoders. In the case of the first generation CD being played back, the data is converted by an oversampling filter and a $\Delta\Sigma$ modulator before being digital to analog converted.

10 Claims, 6 Drawing Sheets

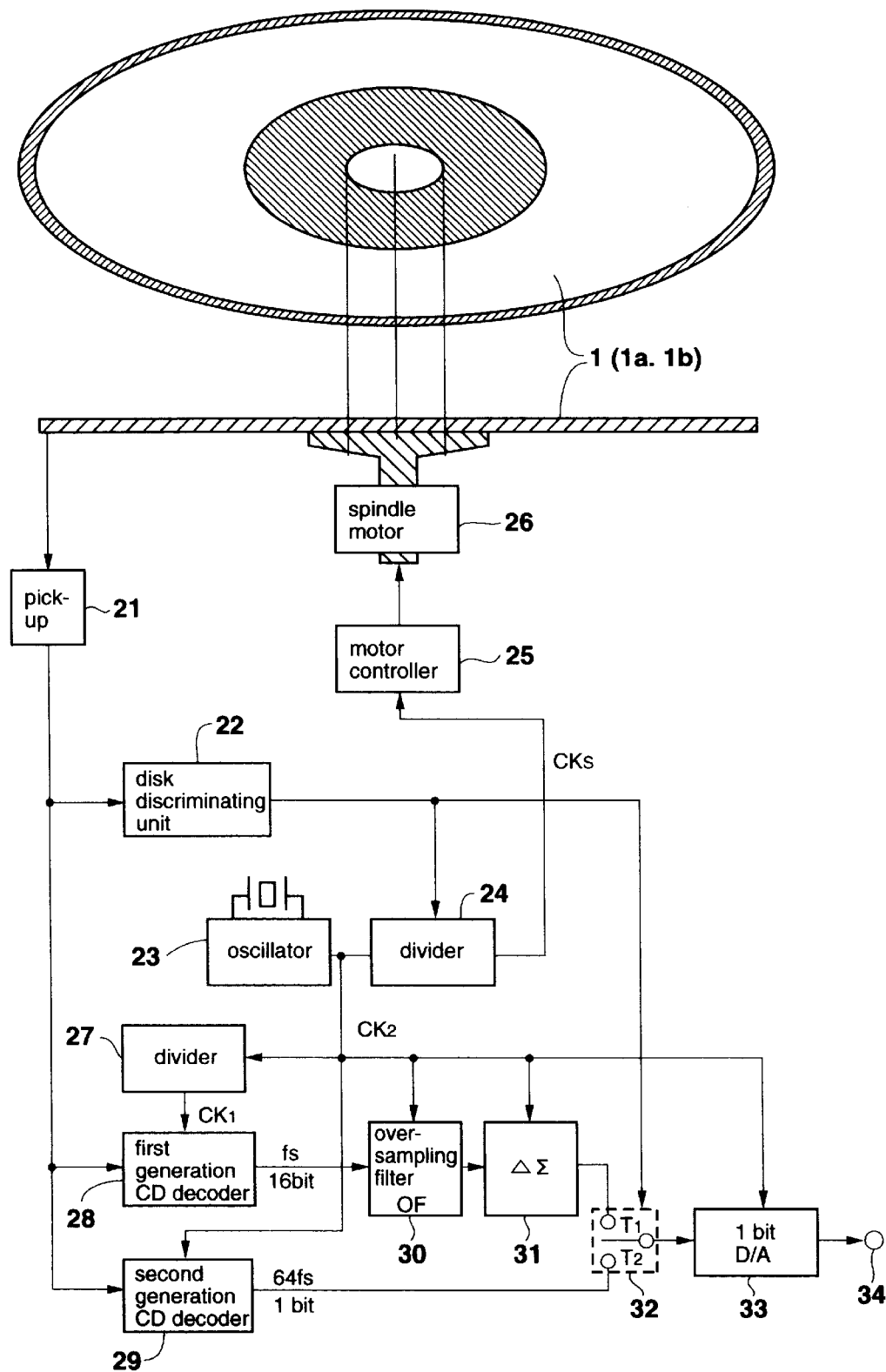

RECORDING MEDIUM, RECORDING APPARATUS AND REPRODUCING APPARATUS

This is a division of application Ser. No. 08/693,440 filed Aug. 7, 1996, now U.S. Pat. No. 5,748,594.

BACKGROUND OF THE INVENTION

1. Field of the Invention

The present invention relates generally to a recording medium using a novel data format and to a recording apparatus and a reproducing apparatus corresponding to this recording medium.

2. Description of the Background

Recently, compact disks (CDS) have become highly popularized as recording media with high sound qualities. A compact disk is a disk-shaped recording medium having a diameter of approximately 12 cm, on which digital audio data is recorded, with a sampling frequency fs selected to be 44.1 kHz and a quantizing bit number selected to be 16 bits.

Even more recently, various research has been performed so as to realize systems with higher sound qualities than those provided by the above-described CDS, which for the sake of easy explanation will be referred to as "the first generation CD", in connection with the development of various media having large storage capacities as well as high transfer rates. To realize such higher sound qualities, the first approach that was conceived is to increase the sampling frequency.

That is, when a sampling frequency fs is equal to 44.1 kHz as in the first generation CD high-frequency components of the audio signal data would be limited to approximately 20 kHz. On the other hand, by setting the sampling frequency higher than 44.1 kHz audio data components higher than 20 kHz can be recorded in order that more naturally sounding audio signals are recorded/reproduced.

On the other hand, while it is possible to establish a novel CD media system with a data format whose sampling frequency is set to be higher than that of the first generation CD, there are various practical problems in this proposed CD media system.

Principally, even when the above-described CD media system with the novel format is realized, this novel CD media system should be compatible with the first generation CD in a practical sense.

For instance, a reproducing apparatus corresponding to the novel system CD with a data format whose sampling frequency is made higher than that of the first generation CD should also be able to reproduce the first generation CD. In such a case where disk compatibility is added to a reproducing apparatus, two separate reproducing-system circuits would at least be required in the digital section of the system, that is, a decoder and a D/A converter corresponding to the first generation CD would be required, and another decoder and D/A converter corresponding to the novel system CD would also be required. Moreover, separate clock generators would have to be separately employed in the respective reproducing-system circuits.

This approach would make the circuit arrangement of the reproducing apparatus more complex and larger in scale, as well as raise costs both of which would be unacceptable.

A playback device with compatibility as described above has inevitably such structure as shown in FIG. 6. In FIG. 6, the disk that is mounted on the turntable may be a first generation CD 1a or a second generation CD 1b. When the first generation CD 1a is mounted, a pickup 41 reads table of contents (TOC) information on the inner periphery of the disk while the disk 1 is being rotated by a spindle motor 46. A disk discriminating unit 42 judges whether the disk 1 is a first generation CD 1a or a second generation CD 1b based on the TOC information.

If the disk 1 is a first generation CD 1a, the disk discriminating unit 42 operates switches 51 and 52 to connect the output of each switch to the respective input terminal T1. An oscillator 43 generates a master clock signal CK1 having a prescribed frequency for processing the first generation CD 1a, the connection of the output of switch 51 to the input terminal T1 results in the supply of the master clock signal CK1 to a motor controller 45. The motor controller 45 generates the desired standard clock signal by frequency dividing the master clock signal CK1, and using the standard clock signal, the motor controller 45 controls the spindle motor 46 so that the disk 1 is rotated at a constant linear velocity. In this example, the constant linear velocity is that prescribed for the first generation CD 1a.

The master clock signal CK1 generated by the oscillator 43 is fed to a first generation CD decoder 47 and a D/A converter 49 for the first generation CD.

The decoder 47 for the first generation CD exercises RF processing, Eight-Fourteen demodulation, and error correction processing to the pit information read from the disk 1a by the pickup 41 and outputs digital audio data having a sampling frequency fs of 44.1 kHz and a quantization number of 16 bits.

The digital audio data is converted to an analog audio signal by the D/A converter 49, and the analog audio signal is output at a terminal 53 through the input terminal T1 and the output of the switch 52.

When the second generation CD 1b is mounted, the disk discriminating unit 42 judges whether the disk 1 is a second generation CD based on the TOC information, and the outputs of switches 51 and 52 are connected to the respective input terminals T2.

An oscillator 44 generates a master clock signal CK2 having a prescribed frequency for processing the second generation CD 1b, and the connection of the output of switch 51 to the input terminal T2 results in the supply of the master clock signal CK2 to the motor controller 45. The motor controller 45 generates a desired standard clock by frequency dividing the master clock signal CK2, and using the standard clock signal the motor controller 45 controls the spindle motor 46 so that the disk 1 is rotated at a constant linear velocity, which in this example is the constant linear velocity prescribed for the second generation CD 1b.

The master clock signal CK2 generated by the oscillator is fed to a decoder 48 for the second generation CD and to a D/A converter 50. The decoder 48 for the second generation CD exercises RF processing, Eight-Fourteen demodulation, and error correction processing to the pit information read from the disk 1 by the pickup 41 and outputs digital audio data having a sampling frequency fs of 96 kHz and quantization number of 24 bits.

The digital audio data is converted to an analog audio signal by a second D/A converter 50, and the analog audio signal is output at terminal 53 through the input terminal T2 and the output of the switch 52 as the playback output.

In order to satisfy the compatibility requirement between the first generation CD 1a and the second generation CD 1b, the playback device is inevitably structured as shown in FIG. 6, however, as seen from the above compatibility requirement such results in complex circuit structure, large size, and expensive cost of the playback device, thus, this method is considered to be disadvantageous. The requirement of two sets of D/A converters, including peripheral devices of the D/A converter such as an amplifier and filter not shown in FIG. 6, is the largest cause of the complex circuit structure of the playback device.

There is another problem on the CD manufacturing side. For example, considering that both a novel type CD and a first generation CD were to be manufactured from a certain music source, such as a master tape of a musical composition and the like, the audio signal derived from the master tape is digitized to produce digital audio data for the novel type CD, while using, for instance, a sampling frequency of 96 kHz.

As a result, the novel type CD with the high sound quality is realized, but the first generation CD manufactured at the same time with the novel type CD would have the difficulty that the digital data with a sampling frequency of 96 kHz must be converted into digital data with a sampling frequency of 44.1 kHz. At this time, the sound quality of the first generation CD would deteriorate due to the jitter phenomenon caused by the sampling rate converting process.

OBJECTS AND SUMMARY OF THE INVENTION

The present invention has been made to solve these problems and, therefore, has as an object to provide a novel type recording medium capable of having better compatibility with the first generation recording medium, and also a recording apparatus and a reproducing apparatus that can employ such a novel type recording medium.

More specifically, as a recording medium wherein while a frequency n, where n is an integer, times 44.1 kHz is used as a sampling frequency, a digitized audio signal is recorded thereon. This digitized audio signal is equal to 1 bit $\Delta\Sigma$-modulated signal.

The present invention provides a recording medium for recording digital audio data whose sampling frequency is n, where n is an integer, times 44.1 kHz, and also a recording apparatus and a reproducing apparatus corresponding to this recording medium. Since the sampling frequency is made higher than 44.1 kHz, a higher sound quality can be realized. In particular, since the recording data is $\Delta\Sigma$-modulated with 1-bit quantization, the sampling frequency can be set to an even higher frequency, so that higher sound qualities can be sufficiently obtained.

Moreover, since the sampling frequency is an integer multiple of the 44.1 kHz employed in the presently available CD system, better matching characteristics between the second generation CD system and the presently available CD system are obtained. Especially, considering the compatibility of the recording medium according to the present invention with the presently available recording medium, since the sampling frequency for the recording medium of the present invention is a multiple integer of that for the presently available recording medium, compatibility is realized with the present invention without an overly complex circuit arrangement for the reproducing apparatus. Also, as a sampling rate converter is not required, there is no deterioration in sound qualities caused by jitter components.

Similarly, in the recording apparatus, since it too has good matching characteristics, and since it's sound quality is not deteriorated by jittering, both the recording medium according to the present invention and the presently available recording medium can be readily manufactured for the same sound source.

As a recording apparatus, there are provided digital audio signal producing means for digitizing an analog audio signal by using a sampling frequency n, where n is an integer, times 44.1 kHz to produce a digital audio signal, and recording means capable of performing preselected recording signal processing on the digital audio signal produced by the digital audio signal producing means to thereby record the processed digital audio signal on a recording medium. Thus, the above-described new recording medium is capable of being produced.

The recording apparatus is further comprised of a filter means for performing a decimation process for reducing the sampling frequency by 1/n with respect to the digital audio signal produced by the digital audio signal producing means, whereby a digital audio signal whose sampling frequency is 44.1 kHz is produced, and a second recording means capable of performing predetermined recording signal processing of the digital audio signal obtained by the filter means to thereby record the processed digital audio signal onto a recording medium. As a consequence, the first generation recording medium whose sampling frequency is 44.1 kHz may be manufactured without deterioration of the sound quality.

As a reproducing apparatus, there are provided clock generating means for generating a clock having a predetermined frequency, decoding means for extracting a digital audio signal from information read out from a recording medium based upon a sampling frequency n times 44.1 kHz and employing the clock output from the clock generating means, and D/A converting means for converting the digital audio signal obtained from the decoding means into an analog signal. Thus, it is possible to realize a reproducing apparatus corresponding to the above-described recording medium.

The reproducing apparatus is further comprised of dividing means for dividing the clock signal generated from the clock generating means into a second clock signal, and second decoding means for extracting a digital audio signal from the information read out from the recording medium based on a sampling frequency of 44.1 kHz with employment of the second clock signal. Accordingly, the recording apparatus is made compatible with the first generation recording medium without a massive increase in the scale of the circuit arrangement.

In accordance with another aspect of the present invention, a sampling frequency conversion means for converting digital data having a first sampling frequency output from a first decoding means for the first recording medium to the digital data having the second sampling frequency is provided. A D/A conversion means for operating on the output generated from a second decoding means for the second recording medium and on the output generated from the sampling frequency conversion means is provided.

More specifically, the D/A conversion means is provided as a conversion means for converting digital data having the second sampling frequency to the analog audio signal, and in respect of the decoded digital data having the first sampling frequency, the data having the first sampling frequency is converted to the data having the second sampling frequency, then, the data having the second sampling frequency is fed to D/A conversion means to convert the digital data to the analog signal.

BRIEF DESCRIPTION OF THE DRAWINGS

FIG. 3 is a block diagram showing a reproducing apparatus according to an embodiment of the present invention.

DETAILED DESCRIPTION OF PREFERRED EMBODIMENTS

Figure 1:
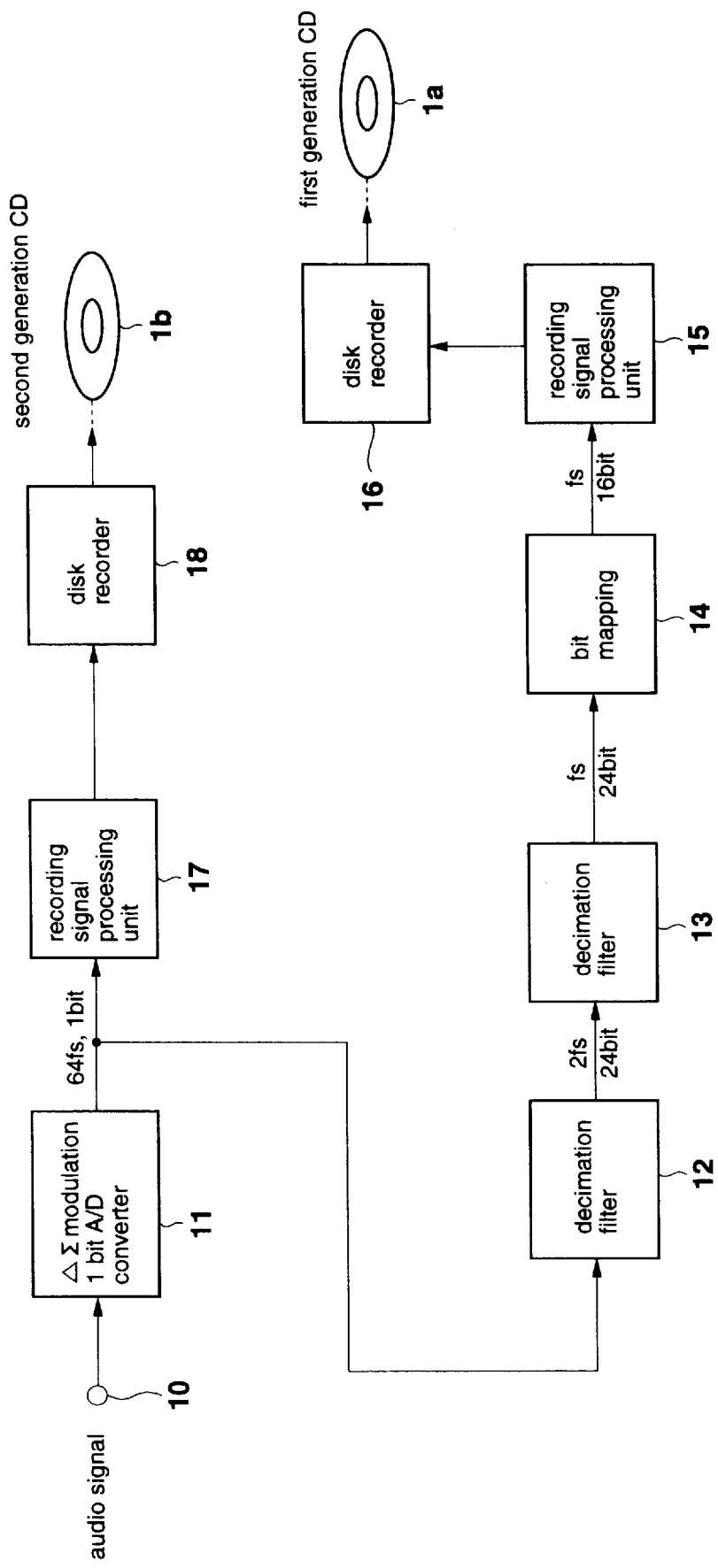
FIG. 1 is a block diagram showing a recording apparatus according to an embodiment of the present invention.

Referring now to FIGS. 1 to 5, embodiments according to the present invention will be explained.

As a recording medium in accordance with one embodiment of the present invention, a recording medium with a higher sound quality may be realized with respect to the first generation CD whose sampling frequency fs is equal to 44.1 kHz and whose quantizing bit number is selected to be 16 bits. A sampling frequency of this novel recording medium is selected to be 2.8224 MHZ, typically fs is 44.1 kHz and 2.8224 MHZ is indicated as 64 fs hereinafter, which is 64 times the sampling frequency of the first generation CD. Furthermore, a digital audio signal of this 64 fs sampling frequency, which has been modulated by 1-bit $\Delta\Sigma$ modulation, is employed as a digital audio signal to be recorded. Such a recording medium (CD) will be referred to hereinafter as a second generation CD. The above-described second generation CD has a diameter of approximately 12 cm, the same as that of the first generation CD.

The second generation CD has a diameter of 12 cm, a disk thickness of 1.2 mm, and a track pitch of 0.74 $\mu$m. The laser wavelength is selected to be either 650 mm or 635 nm, which is shorter than that for the conventional or first generation, CD. Thus, the recording density of the second generation CD is increased to 4.7 Gigabytes to achieve a higher density disk.

Furthermore, another second generation CD has been proposed, in which the disk thickness of this second generation CD is subdivided into two thicknesses, that is, 0.6 mm and 0.6 mm, so that two recording layers are provided on one surface of the disk. The track pitch is selected to be 0.74 $\mu$m, so that the recording capacity of each recording layer is approximately 4.7 Gigabytes and, therefore, the entire recording capacity of this second generation CD becomes approximately 8.5 Gigabytes in total.

In addition to the above-explained disk having the two recording layers on one surface thereof, a still further second generation CD has been proposed, in which recording regions are formed on both surfaces of this disk which has a diameter of 12 cm and a disk thickness of 1.2 mm, and the track pitch thereof is 0.74 $\mu$m. Accordingly, this double recording surface disk has a recording capacity of 9.4 Gigabytes in total.

As to the 1-bit $\Delta\Sigma$-modulated signal, a sampling frequency thereof may be set to achieve considerably higher values of data capacity and data transfer rate as compared with conventional PCM-modulated signals. Therefore, in accordance with this embodiment of the present invention, while the sampling frequency is selected to be 64 fs, it is possible that audio data containing a high frequency component up to 1.4 MHZ may be recorded/reproduced. As a result, it is possible to provide a second generation CD whose sound qualities are extremely improved compared with those of the first generation CD.

Also, since the sampling frequency of the second generation CD is an integer multiple of the sampling frequency of the first generation CD, this second generation CD matches the first generation CD system and compatibility is maintained.

First, a description will be made of a recording apparatus corresponding to this second generation CD with reference to FIGS. 1 and 2A–2D.

FIG. 1 is a schematic block diagram of a recording apparatus that can be used in the manufacture of the second generation CD, as well as the first generation CD.

Figure 2C:
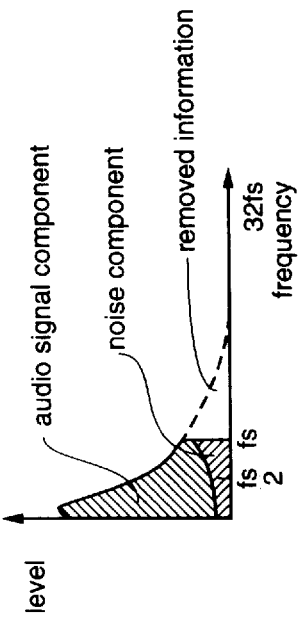
FIGS. 2A–2D are explanatory diagrams for explaining a frequency spectrum of a signal at each operating stage of recording apparatus according to the embodiment.
Figure 2D:
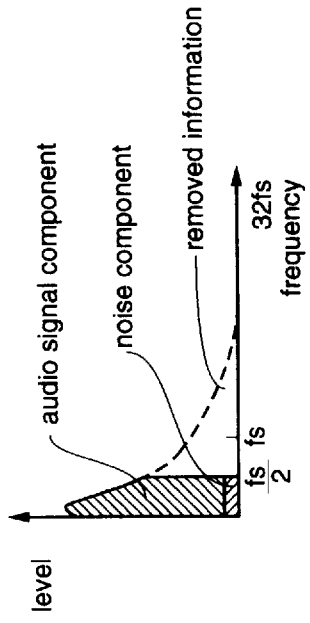
Figure 2A:
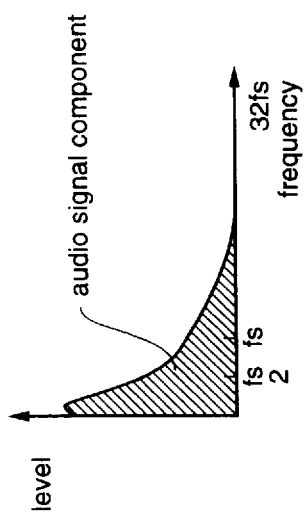

An analog audio signal is fed in at input terminal 10 as an original audio signal derived from a master tape. A frequency spectrum of the analog audio signal is represented in FIG. 2A.

Figure 2B:
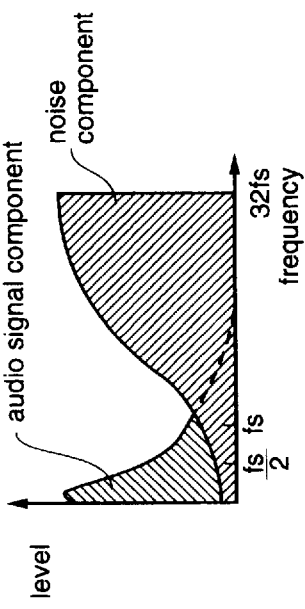

This analog audio signal is converted into digital data by a 1-bit $\Delta\Sigma$ modulation A/D converter 11. At this time, because the sampling frequency is selected to be 64 fs a digital audio signal with a 64 fs/1-bit format is produced. A frequency spectrum of this 64 fs/1-bit formatted digital audio signal is shown in FIG. 2B. In other words, in principle, audio data in a frequency range up to 32 fs may be digitized and substantially all signal components of the analog audio signal shown in FIG. 2A remain as digital data.

Also, quantizing noise components appear under a condition such that they are collected on a high frequency side of a frequency range due to the noise shaping function achieved in the $\Delta\Sigma$ modulation.

This 64 fs/1-bit digital audio signal is supplied to a recording signal processing unit 17 so as to be directly modulated to produce a recording signal. That is, the 64 fs/1-bit signal is directly used as the digital audio data to be recorded. In the recording signal processing unit 17, for instance, an error correction code is added to the data and also a modulating process such as an Eight-Fourteen Modulation (EFM) for recording purposes is performed. Then, a signal corresponding to the actual pit information to be formed on a disk is produced as a recording signal by this recording signal processing unit 17.

This recording signal is supplied to a disk recorder 18 so as to perform a recording operation based on the recording signal, namely, a pit forming operation for an original disk, so that an original CD comprising music software may be manufactured as the second generation CD 1b. From this original CD 1b manufactured in the above-described manner, a stamper (not shown) is fabricated, whereby large numbers of the second generation CD 1b may be mass produced using the stamper.

In the case where a first generation CD is also manufactured for the same music software, the 64 fs/1-bit signal from the $\Delta\Sigma$-modulation 1-bit A/D converter 11 is supplied to a first decimation filter 12 so as to be converted into 2 fs (=88.2 kHz)/24-bit digital data. A frequency spectrum of the 2 fs/24-bit digital data is shown in FIG. 2C. That is, since the sampling frequency is reduced to 2 fs, a data component in a frequency range up to the frequency fs is left.

This 2fs/24-bit digital data is filtered by a second decimation filter 13 to become fs(=44.1 kHz)/24-bit digital data. A frequency spectrum of the fs/24-bit digital data is shown in FIG. 2D. A data component of a frequency range up to (½) fs remains.

The sampling frequency is set to 1/64 by way of these decimation filters 12 and 13. This process operation does not correspond to a so-called sampling rate conversion but, rather, is due to perfectly synchronized digital filters for performing the 64:1 decimation. Accordingly, there is no factor present to cause a jitter component.

This fs/24-bit digital data from the decimation filter 13 is converted by a bit mapping unit 14 into data whose quantizing bit number is 16 bits, which will then be supplied to a recording signal processing unit 15. In the recording signal processing unit 15, a preselected process operation such as adding an error correction code and performing Eight-Fourteen Modulation (EFM) is carried out on the fs/16-bit digital audio signal so as to thereby produce a recording signal. This recording signal is supplied to another disk recorder 16. Based on this recording signal, the disk recorder 16 forms pits in an original disk, so that an original CD of the music software is formed as a first generation CD 1a. A stamper (not shown) is fabricated from this original CD 1a manufactured in this manner. Accordingly, the first generation CD 1a is then mass produced using the stamper.

As described above, in accordance with the recording apparatus of FIG. 1, the first generation CD 1a and the second generation CD 1b can be manufactured. Here, since the 64 fs/1-bit digital audio data is directly employed as the recording signal for the second generation CD, this second generation CD 1b becomes a disk whose sound quality is considerably improved.

Also, since the sampling frequency of the second generation Cd 1b is an integer multiple of that of the first generation CD, the sound quality of the fabricated first generation CD 1a is not deteriorated compared with that of a conventional first generation CD. In other words, in performing the sampling frequency conversion only a filtering process for performing the 1/64 decimation is required and, because the sampling rate converter is no longer required, the jitter components that accompany sampling rate conversion are not produced. As a consequence, it is possible to achieve a sound quality of this manufactured first generation CD 1a that is equivalent to that of a conventional CD obtained when the analog audio signal is directly sampled by 44.1 kHz.

Next, a description is made of a reproducing apparatus corresponding to the second generation CD 1b.

FIG. 3 is a schematic block diagram showing major portions of the reproducing apparatus. It should be noted that this reproducing apparatus is also capable of reproducing the first generation CD 1a. A disk 1, which can be either the first generation CD 1a or the second generation CD 1b, is rotatably driven by a spindle motor 26.

The spindle motor 26 is driven in a constant linear velocity (CLV) mode in response to a drive signal from a motor controller 25.

A detailed description of spindle servo operation by the motor controller 25 for CLV control is omitted, because such servo systems are well known. A clock signal CK2 produced by an oscillator 23 is divided by a divider 24 to thereby obtain a predetermined reference clock signal CKs. Then, a PLL system clock that has been synchronized with the reproduced data is compared in the motor controller 25 with this reference clock CKs so as to produce an error signal. Power is supplied to the spindle motor 26 according to this error signal, so that the CLV servo is operated. Although not shown in the drawing, the PLL system clock may be implemented, for instance, by supplying extracted data into the PLL circuit within a first generation CD decoder 28 and a second generation CD decoder 29.

While the disk 1 is rotated, a pickup 21 irradiates laser light onto the recording surface of the disk 1, and then the laser light reflected from the recording surface thereof is detected by the pickup 21, so that the information formed on the disk 1 in the form of pits may be read out.

The information read by the pickup 21 is supplied to a first generation CD decoder 28 and to a second generation CD decoder 29.

A clock signal CK2 having a frequency that will be used to decode the data in the second generation CD decoder 29 is generated by an oscillator 23, and this clock signal CK2 is supplied to the second generation CD decoder 29. The clock signal CK2 generated by the oscillator 23 is also divided by another divider 27 to produce another clock signal CK1 having a frequency that will be used to decode the data in the first generation CD decoder 28, and this second clock signal CK1 is supplied to the first generation CD decoder 28.

A 16-bit digital audio signal whose sampling frequency is equal to fs is decoded and output from the first generation CD decoder 28. This 16-bit signal is then converted into a 1-bit digital audio signal whose sampling frequency is equal to 64 fs by way of an over sampling filter 30 and a ΔΣ modulation circuit 31. Then, this 1-bit digital audio signal is supplied to an input terminal T1 of a switch 32.

The output from the switch 32 is supplied to a 1-bit D/A converter 33 to be converted into an analog audio signal, which is then output from an output terminal 34. To this 1-bit D/A converter 33, the clock signal CK2 generated by the oscillator 23, namely, a clock signal identical to the clock signal for the second generation CD decoder 29, is supplied.

A disk discriminating unit 22 functions to discriminate whether the loaded disk 1 is a first generation CD 1a or a second generation CD 1b. This discrimination may be achieved by reading the table of contents (TOC) data recorded on the innermost peripheral side of the disk.

The disk discriminating unit 22 controls operation of the switch 32, as well as the dividing ratio of the divider 24 according to the discrimination result.

Operations of the above-described reproducing apparatus will now be explained.

First, it is assumed that the disk 1 to be reproduced is a second generation CD 1b. When the disk discriminating unit 22 initially discriminates the loaded disk 1 as a second generation CD 1b based upon the TOC data, the disk discriminating unit 22 sets the dividing ratio of the divider 24 to the proper value for a second generation CD 1b. Also, the disk discriminating unit 22 causes the output of the switch 32 to be connected to a terminal T2.

Since the dividing ratio of the divider 24 is set a the value corresponding to the second generation CD 1b, the frequency of the reference clock signal CKs used for the CLV servo in the motor controller 25 becomes the frequency corresponding to the second generation CD 1b. That is, the disk 1 is rotatably driven at a linear speed corresponding to the second generation CD 1b.

At this time, since the pit information extracted by the pickup 21 is decoded by the second generation CD decoder 29, the 64 fs/1-bit digital audio signal is decoded and since the output of the switch 32 is connected to the terminal T2, the 64 fs/1 bit digital audio signal is supplied to the 1-bit D/A converter 33 so as to be thereby converted into the analog audio signal.

Secondly, it is assumed that the disk 1 to be reproduced is a first generation CD 1a, so that when the disk discriminating unit 22 initially discriminates the loaded disk 1 as a first generation CD 1a based upon the TOC data, the disk discriminating unit 22 sets the dividing ratio of the divider 24 to a proper value for a first generation CD 1a. Also, the disk discriminating unit 22 causes the output of the switch 32 to be connected to the input terminal T1.

Since the dividing ratio of the divider 24 is set to the value corresponding to a first generation CD 1a, the frequency of the reference clock signal CKs used for the CLV servo in the motor controller 25 becomes the frequency corresponding to a first generation CD 1a. That is, the disk 1 is rotatably driven at a linear speed corresponding to a first generation CD 1a.

At this time, since the pit information extracted by the pickup 21 is decoded by the first generation CD decoder 28, the fs/16-bit digital audio signal is properly decoded. This fs/16-bit digital audio signal is processed by the over sampling filter 30 and the ΔΣ modulation circuit 31, which are operated in response to the clock signal CK2, to be converted into a 64 fs/1 bit digital audio signal. Then, since the output of the switch 32 is connected to the terminal T1, the 64 fs/1 bit digital audio signal is supplied to the 1 bit D/A converter 33 to be thereby converted into the analog audio signal.

By reproducing the second generation CD 1b in accordance with such a reproducing apparatus, audio data with very high sound quality can be reproduced using 64 fs. Also, since the sampling frequency of the second generation CD 1b is an integer multiple of the sampling frequency of the first generation CD 1a, as represented in FIG. 3, it is possible to realize a reproducing apparatus having compatibility, even when the clock system and the reproduction system do not involve very complex circuit arrangements.

In other words, as to the clock system, since the ratio of the sampling frequency of the first generation CD 1a to that of the second generation CD 1b constitutes an integer ratio, the clock signal from the oscillator 23 can be used in common. That is to say, even when a plurality of oscillators are not employed, it is possible to easily generate clocks having the necessary frequencies by using frequency dividers. As a result, two independent master clock systems need not be constructed, and the circuit arrangement of the clock system can be made simple.

Also, with respect to the reproducing system, the 1-bit D/A converter 33 can be used in common, so that the circuit arrangement of the reproducing system can also be made simple. Moreover, sound quality does not deteriorate using this system.

Since the 1-bit D/A converter 33 is a D/A converter that performs operations according to data reproduced from the second generation CD 1b, there are absolutely no problems with respect to a second generation CD 1b. To also use this 1-bit D/A converter 33 for the data reproduced from the first generation CD 1a, fs/16-bit data decoded from the first generation CD decoder 28 must be converted into 64 fs/1-bit data. Since the sampling frequency is an integer multiple, however, the fs/16-bit data is simply oversampled 64 times by the oversampling filter 30 and converted into 64 fs/1-bit data by the ΔΣ modulation circuit 31. Thus, a sampling rate converter is not required. As a consequence, since there is no factor to produce the jitter component, the sound quality of the first generation CD 1a is not deteriorated.

Figure 4:
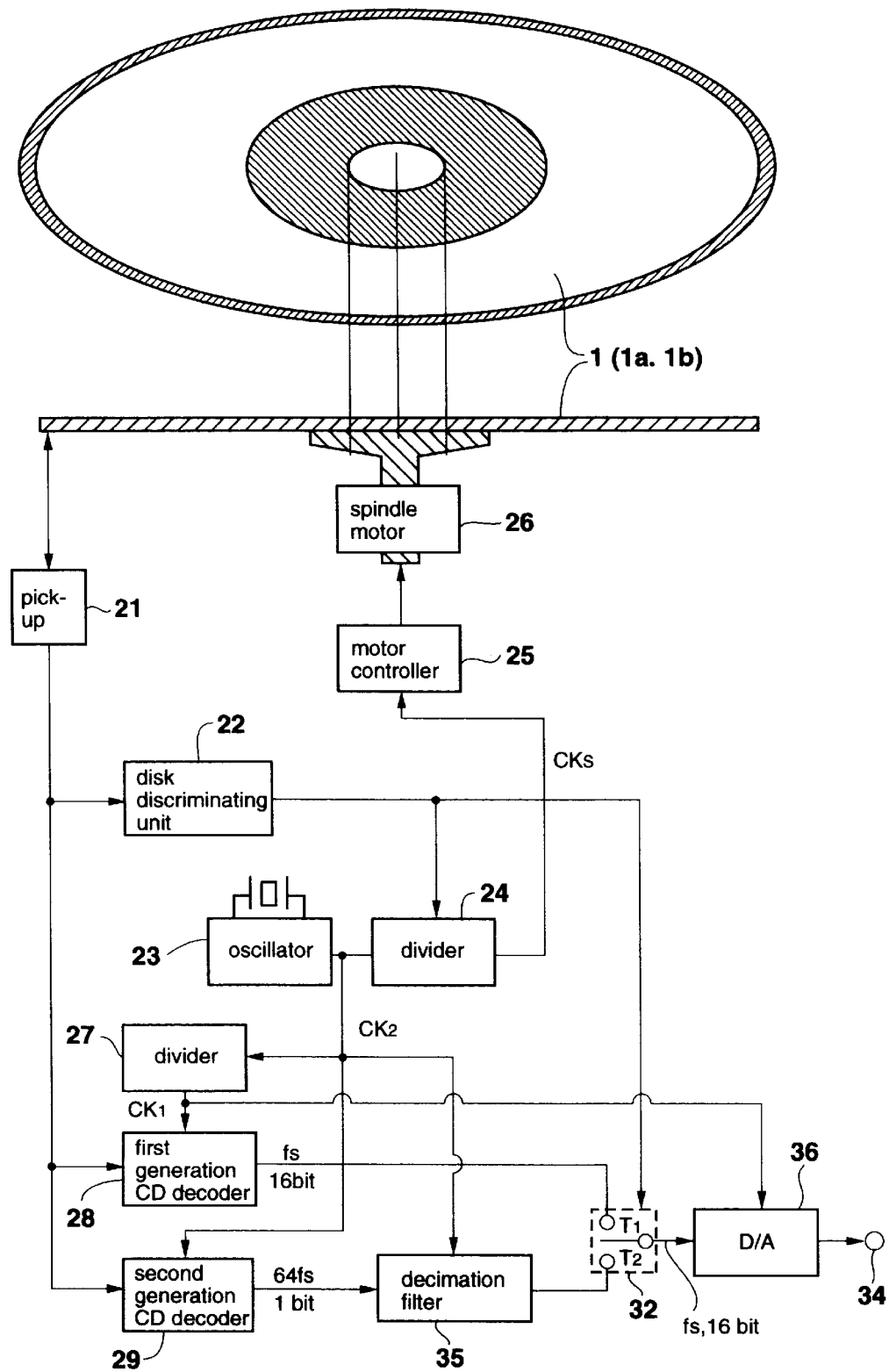
FIG. 4 is a block diagram showing a reproducing apparatus according to another embodiment of the present invention.

FIG. 4 represents another arrangement of the reproducing apparatus, in which the same reference numerals shown in FIG. 3 are employed to denote the same functional units and explanations thereof are omitted.

In this case, a D/A converter 36 corresponds to a D/A converter operated in response to the clock signal CK1 and has a sampling frequency fs.

As a result, when the first generation CD 1a is reproduced the fs/16-bit reproduced data output from the first generation CD decoder 28 is directly supplied via the switch 32 to the D/A converter 36, so that this reproduced data is converted into analog audio data.

On the other hand, when the second generation CD 1b is reproduced, the 64 fs/1-bit reproduced data outputted from the second generation CD decoder 29 is processed in a decimation filter 35 using 64:1 decimation processing. Then, since this fs/16-bit reproduced data is supplied via the switch 32 to the A/D converter 36, this fs/16-bit reproduced data is converted into analog audio data.

In this case, as with the reproducing apparatus of FIG. 3, compatibility can be realized by a simple clock reproducing system, and there is no deterioration in the sound quality caused by joint use of the D/A converter 36. That is, there is no possibility that jitter components are produced in the decimation process of the decimation filter 35.

Figure 5:
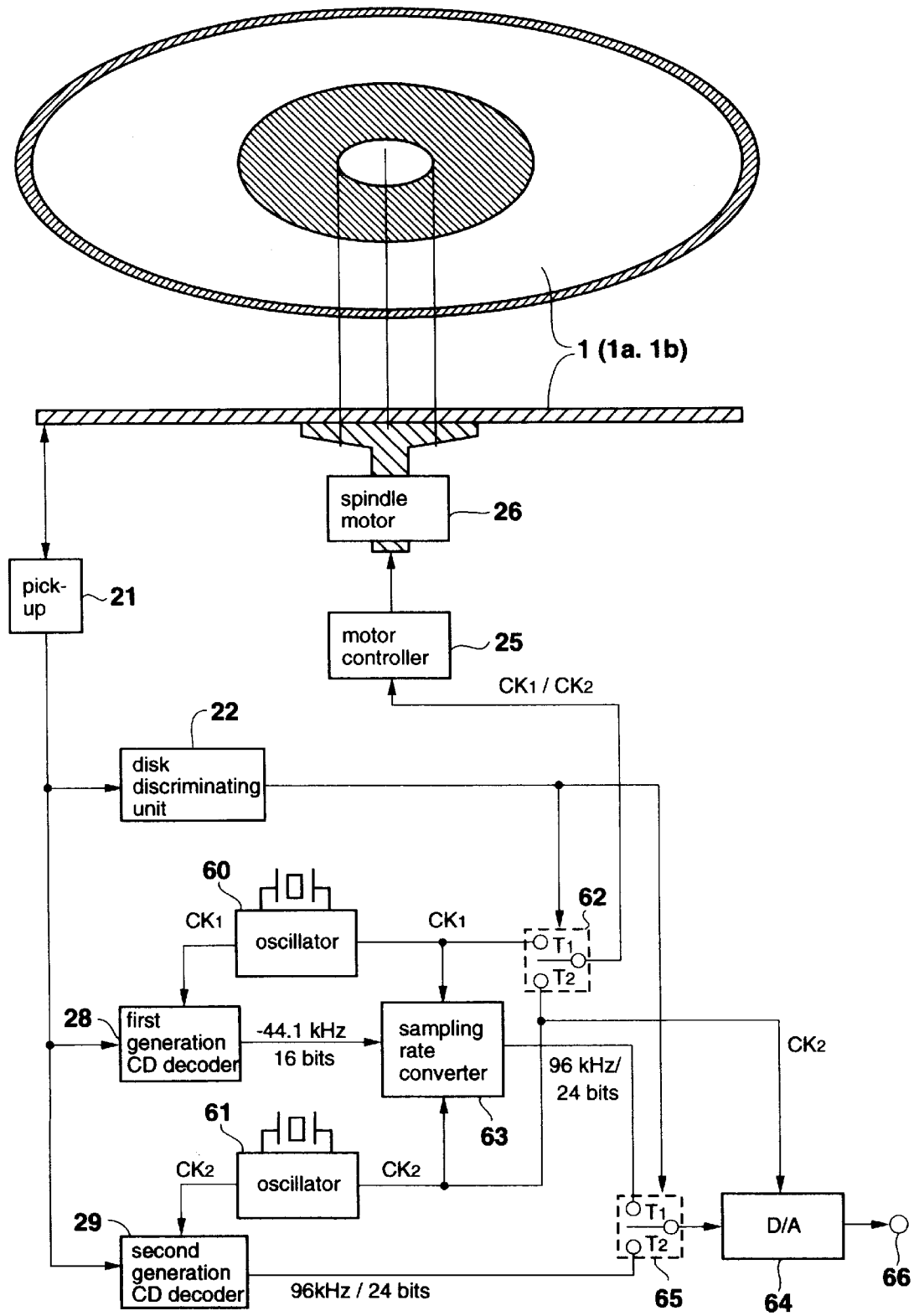
FIG. 5 is a block diagram showing a reproducing apparatus according to yet another embodiment of the present invention.
Figure 6:
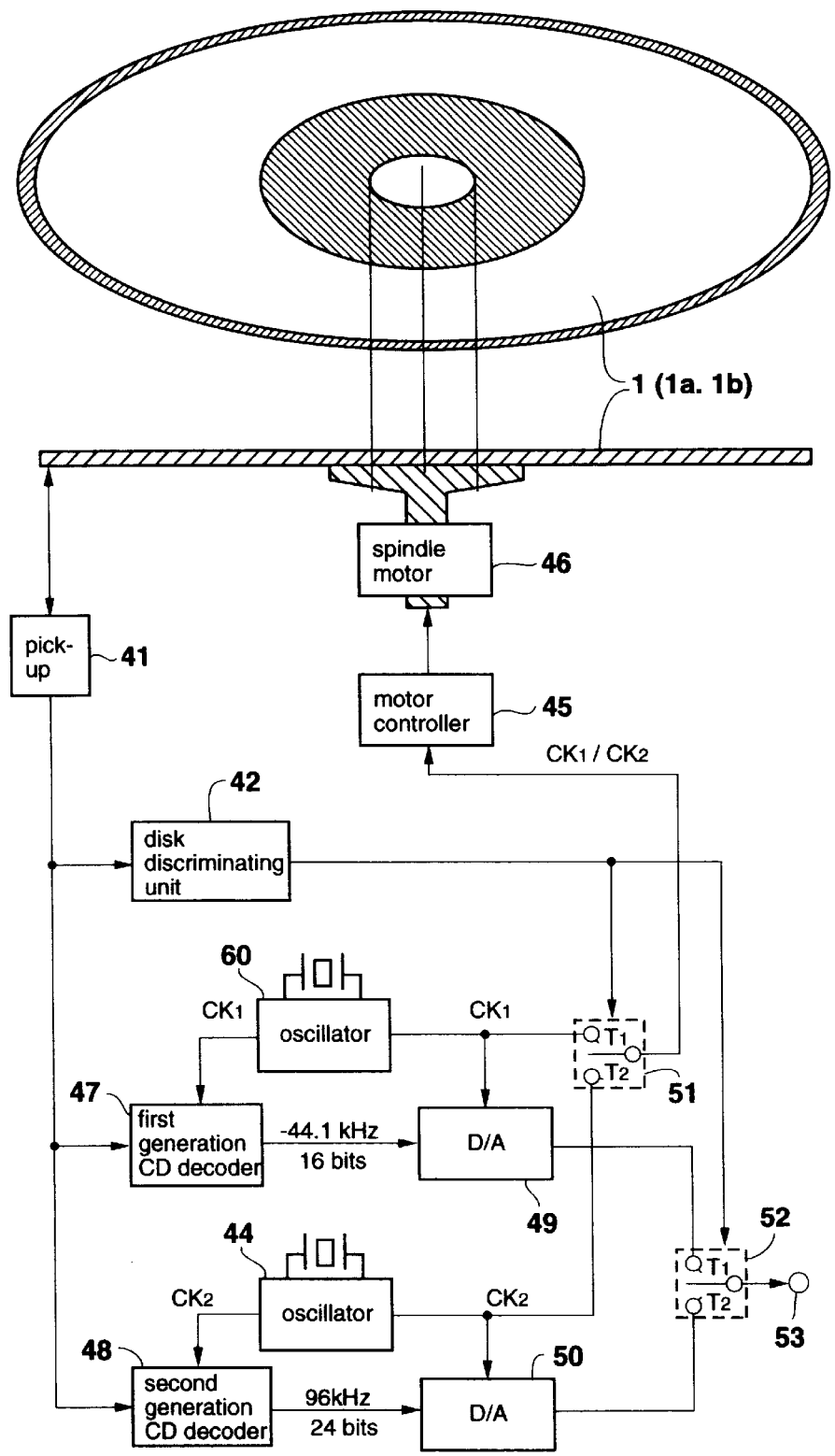
FIG. 6 is a block diagram showing a reproducing apparatus that was previously proposed.

FIG. 5 represents another arrangement of the reproducing apparatus, in which the same reference numerals shown in FIGS. 3 and 4 are employed to denote the same functional units and explanations thereof are omitted.

Although the description of the spindle servo operation of the constant linear velocity control by the motor controller 25 is not repeated, the clock signal CK1 generated by a first oscillator 60 or the clock signal CK2 generated by a second oscillator 61 is fed to the spindle motor 26 through the output of a switch 62. The clock signal CK1 or clock signal CK2 is subjected to a required frequency division processing, and the standard clock signal having a prescribed frequency corresponding to the first generation CD 1a or the second generation CD 1b is compared with PLL clock synchronous with the playback data to generate an error signal. Then, the control linear velocity servo is exercised by applying power to the spindle motor spindle motor depending on the error signal. Although the PL. clock is not shown in the drawings, the PL. clock signal is generated by feeding the data extracted in the decoder 28 for the first generation CD when the first generation CD 1a is regenerated or from the decoder 29 for the second generation CD when the second generation CD 1b is regenerated to the PLL circuit.

When the disk 1 is rotated, the pickup 21 irradiates a laser beam on the record surface of the disk 1, and the reflected beam is detected to read the pit information formed on the disk 1.

The information read by the pickup 21 is fed to the decoder 28 for the first generation CD and to the decoder 29 for the second generation CD. The decoder 28 for the first generation CD and the decoder 29 for the second generation CD each exercise RF processing, Eight-Fourteen demodulation, error correction, and de-interleave processing depending on the first generation CD 1a and the second generation CD 1b, respectively, to obtain digital audio data.

The clock signal is fed from the oscillator 60 to the decoder 28 for the first generation CD as a clock signal for the decoding processing. The clock signal CK2 is fed from a second oscillator 61 to the decoder 29 for the second generation CD as a clock signal for the decoding processing. The digital audio signal having a sampling frequency fs of 44.1 kHz and a quantization bit number of 16 bit is output from the decoder 28 for the first generation CD as the decoded output. The digital audio signal having a sampling frequency fs of 96 kHz and a quantization bit number of 24 bits is output from the decoder 29 for the second generation CD as the decoded output.

The output from the decoder 28 for the first generation CD is fed to a sampling rate converter 63. The clock signal CK1 and the clock signal CK2 are fed to the sampling rate converter 63. The sampling rate converter 63 converts the digital audio signal having a sampling frequency fs of 44.1 kHz and 16 quantization bits to a digital audio signal having a sampling frequency fs of 96 kHz and 24 quantization bits.

The output from the sampling rate converter 63 and the output from the decoder 29 for the second generation CD are fed to a D/A converter 64 selectively by switch 65. The clock signal CK2 is fed to the D/A converter 64 as a clock signal for the processing, the D/A converter 64 converts the digital audio signal having a sampling frequency fs of 96 kHz and 24 quantization bits to the analog audio signal. The analog audio signal is outputted from the terminal 66 as the playback signal.

The disk discriminating unit 22 is a section for judging whether the disk 1 mounted is a first generation CD 1a or a second generation CD 1b. The judgment is possible by reading TOC data recorded on the innermost periphery of the disk. The disk judging section 22 controls the switches 62 and 65 depending on the judged result.

Operation of such a playback device is described hereinunder.

First, operations for playback of the disk 1 of the second generation CD 1b are described. The disk discriminating unit 22 judges whether the disk 1 is a second generation CD 1b based on the TOC data on the disk 1, then, the disk discriminating unit 22 operates the switches 62 and 65 to connect the outputs thereof to the respective input terminals T2.

Thereby, the clock signal CK2 is fed to the motor controller 25, and the frequency for the standard clock signal used for the constant linear velocity servo is converted to the frequency which corresponds to the second generation CD 1b. In other words, the disk 1 is driven rotationally at a linear velocity which corresponds to the second generation CD 1b.

Then, the pit information extracted by the pickup 21 is decoded by the decoder 29 for the second generation CD, thereby, the digital audio signal having a sampling frequency fs of 96 kHz and 24 quantization bits is obtained. When, the switch 65 is connected to the terminal T2, therefore, the digital audio signal of 96 kHz/24-bit format is fed to the D/A converter 64 and converted to the analog audio signal.

Next, operations for playback when the disk 1 is a first generation CD 1a. The disk discriminating unit 22 judges whether the disk 1 is a first generation CD 1a based on the TOC data on the disk 1, then, the disk discriminating unit 22 operates the switches 62 and 65 to connect the outputs thereof to the respective input terminals T1.

Thereby, the clock signal CK1 is fed to the motor controller 25. The frequency of the standard clock signal used for the constant linear velocity servo, which is obtained by frequency dividing the clock signal CK1, is converted to the frequency which corresponds to the first generation CD 1a. In other words, the disk 1 is driven rotationally at a linear velocity which corresponds to the first generation CD 1a.

Then, the pit information extracted by the pickup 21 is decoded by the decoder 28 for the first generation CD, thereby, the digital audio signal of 44.1 kHz/16-bit format is decoded.

The digital audio signal of 44.1 kHz/16-bit format is converted to the digital audio signal of 96 kHz/24-bit format by the sampling rate converter 29. Then, the output of switch 65 is connected to the input terminal T1, therefore, the digital audio signal of 96 kHz/24-bit format is fed to the D/A converter 64 and converted to the analog audio signal.

By using such a playback device, when a second generation CD 1b is regenerated, the audio data of 96 kHz/24-bit format is regenerated to provide high quality sound.

For playback of the first generation Cd 1a, the decoded digital audio signal of 44.1 kHz/16-bit format is converted to the digital audio signal of 96 kHz/24-bit format by the sampling rate converter 63.

Therefore, the D/A converter 64 which corresponds to the digital audio signal of 96 kHz/24-bit format is used also for playback of the first generation CD 1a, thereby only one set of D/A converting circuits (D/A converter, and peripheral devices such as an amplifier and filter) is sufficient for the playback circuit, thus, the structure of the playback circuit is simplified.

It should be noted that although the above-explained embodiments have been described such that the presently available CD system is the first generation CD 1a and the second generation CD 1b has characteristics that match those of this first generation CD 1a, the present invention is not limited to CD systems.

For instance, in a digital tape recorder system it is possible to realize such a recording/reproducing system by employment of a sampling frequency that is an integer multiple of 44.1 kHz.

Also, in a recording/reproducing system whose sampling frequencies are selected to be 32 kHz and 48 kHz, when the present invention is applied, such a system may be constructed whose sampling frequency is set to either 32 kHz×n or 48 kHz×n, where n is an integer. In particular, a sampling frequency of 48 kHz×n may be suitably used in next-generation video recording/reproducing media.

What is claimed is:

1. A reproducing apparatus for reproducing a first digital signal formatted by multi-bit data words sampled at a first sampling frequency from a first recording medium and a second digital signal formatted by 1-bit data words sampled at a second sampling frequency higher than the first sampling frequency from a second recording medium, comprising:

a pick-up head for reproducing a digital signal from one of the first and second recording medium;

first decoding means for decoding the multi-bit data words sampled at the first sampling frequency corresponding to the first recording medium;

second decoding means for decoding the 1-bit data words sampled at the second sampling frequency corresponding to the second recording medium;

discriminating means for discriminating the first recording medium and the second recording medium; and switching means for switching digital output signals from the first decoding means and the second decoding means in accordance with a result of said discriminating means.

2. The reproducing apparatus according to claim 1, further comprising:

over sampling means for converting sampling frequency of the digital output signal from the first decoding means to the second sampling frequency;

delta-sigma modulating means for converting multi-bit data words sampled at the second sampling frequency to 1-bit data words sampled at the second sampling frequency.

3. The reproducing apparatus according to claim 1, further comprising:

down sampling means for converting the sampling frequency of the digital signal from the second decoding means to the first sampling frequency.

4. The reproducing apparatus according to claim 1, wherein said first decoding means decodes signals from said first recording medium formatted by 16-bit data words sampled at 44.1 KHz.

5. The reproducing apparatus according to claim 1, wherein said second decoding means decodes signals from said second recording medium formatted by 1-bit data words sampled at 2.8224 MHz.

6. The reproducing apparatus according to claim 5, wherein a base plate of the second recording medium has a diameter not larger than 120 mm and a thickness of the second recording medium is larger than 0.6 mm.

7. The reproducing apparatus according to claim 6, wherein a recording track of the second recording medium is formed at a track pitch of approximately 0.74 μm and the track has an information recording capacity of not less than 4.7 Gbytes.

8. The reproducing apparatus according to claim 1, wherein the recording medium is recorded with a high-speed one-bit data stream output from a delta-sigma modulation analog to digital converter at a sampling frequency of n×44.1 KHz, where n is an integer.

9. The reproducing apparatus according to claim 8, wherein a base plate of the recording medium has a diameter not larger than 120 mm and a thickness of the second recording medium is larger than 0.6 mm.

10. The reproducing apparatus according to claim 9, wherein a recording track of the second recording medium is formed at a track pitch of approximately 0.74 μm and the track has an information recording capacity of not less than 4.7 Gbytes.

* * * * *